United States Patent [19]
Koehler

[11] 3,762,876
[45] Oct. 2, 1973

[54] DRIVEN-VANE ANEMOMETERS

[75] Inventor: Lyle E. Koehler, New Brighton, Minn.

[73] Assignee: Honeywell Inc., Minneapolis, Minn.

[22] Filed: Oct. 7, 1971

[21] Appl. No.: 187,276

[52] U.S. Cl. ................................................. 73/189
[51] Int. Cl. .......................................... G01w 1/04
[58] Field of Search ...................... 73/189, 194, 229

[56] References Cited
UNITED STATES PATENTS

| | | | |
|---|---|---|---|
| 3,282,099 | 11/1966 | Kingman | 73/189 |
| 3,360,989 | 1/1968 | Herrington | 73/189 |
| 3,381,529 | 5/1968 | Martin et al. | 73/189 |

*Primary Examiner*—Herbert Goldstein
*Attorney*—Charles J. Ungemach et al.

[57] ABSTRACT

A driven vane anemometer and detection electronics therefor, for measuring both wind velocity and wind direction. An asymmetrically vaned rotor attached to a motor-driven shaft is used to produce a wind drag torque which varies cyclically with the rotation of the shaft. The difference between the maximum torque and the minimum torque throughout the cycle is indicative of wind velocity, and the azimuthal position of the maxima and minima as compared to a reference position is indicative of wind direction.

7 Claims, 4 Drawing Figures

3,762,876

LYLE E. KOEHLER
INVENTOR.

BY
ATTORNEY

DRIVEN-VANE ANEMOMETERS

BACKGROUND OF THE INVENTION

This invention relates generally to anemometers, and more particularly to driven vane anemometers.

For many years, wind velocity has been measured by means of anemometers, and wind direction has been measured by weather vane type devices. Generally, these anemometers comprise a rotatable shaft to which is attached a plurality of cup vanes shaped for imparting a torque to the shaft when placed in the wind. The vanes are oriented so that the torque components they produce are all of the same sense with respect to the shaft. Some sort of calibrated shaft speed measuring device is used to measure shaft speed which is indicative of wind velocity. Such a device while offering the advantage of simplicity, suffers the disadvantages of relative insensitivity to low wind velocities, erroneous readings as the shaft bearings become old and worn, and incapability of measuring wind direction. Usually, a separate weather vane is employed for this purpose.

There have also been employed in the prior art certain driven vane anemometers which are intended to overcome some of the disadvantages of the above-described anemometers. In such devices cup type vanes attached to a shaft are driven in rotation against the wind by a motor. A speed pickoff and feedback loop is employed to keep the motor operating at a constant speed. The amount of current supplied to the motor is indicative of the drag due to the wind velocity, and a meter which measures motor current is calibrated in terms of wind velocity for use as a readout. Such a device has improved low speed sensitivity over the passive type anemometer, but is still subject to the disadvantages of inaccurate readings due to bearing friction, and inability to measure wind direction. In this type of prior art device, as bearing friction increases because of wear, or due to poor lubrication of the motor, this friction acts as an additional drag on the shaft, just the same as a wind induced drag. Thus, the additional current supplied to the motor to overcome the bearing drag is merely added to the wind drag and erroneous readings result. It is necessary with such a device to also use a separate weather vane type device in order to determine wind direction.

To overcome these and other disadvantages, the applicant has provided a new and improved driven vane anemometer. An anemometer according to the applicant's invention, is capable of sensing both wind velocity and wind direction, without the use of a separate weather vane. Output signals from applicant's anemometer are unaffected by changes in motor and shaft bearing friction.

SUMMARY OF THE INVENTION

According to the present invention there is provided a driven rotor anemometer having an asymmetrical vane rotor attached to a shaft which is driven by a driving means and detection means for indirectly measuring wind velocity by measuring the torque produced by the driving means to overcome the drag torque produced by the wind on the vaned rotor. Reference means is provided for producing a reference signal when the rotor is in a predetermined position, and the detection means is adapted for comparing the reference signal to the cyclic variations in the torque produced by the driving means thereby to measure the direction of the wind relative to the reference means.

DESCRIPTION OF THE PREFERRED EMBODIMENT

Figure 1:
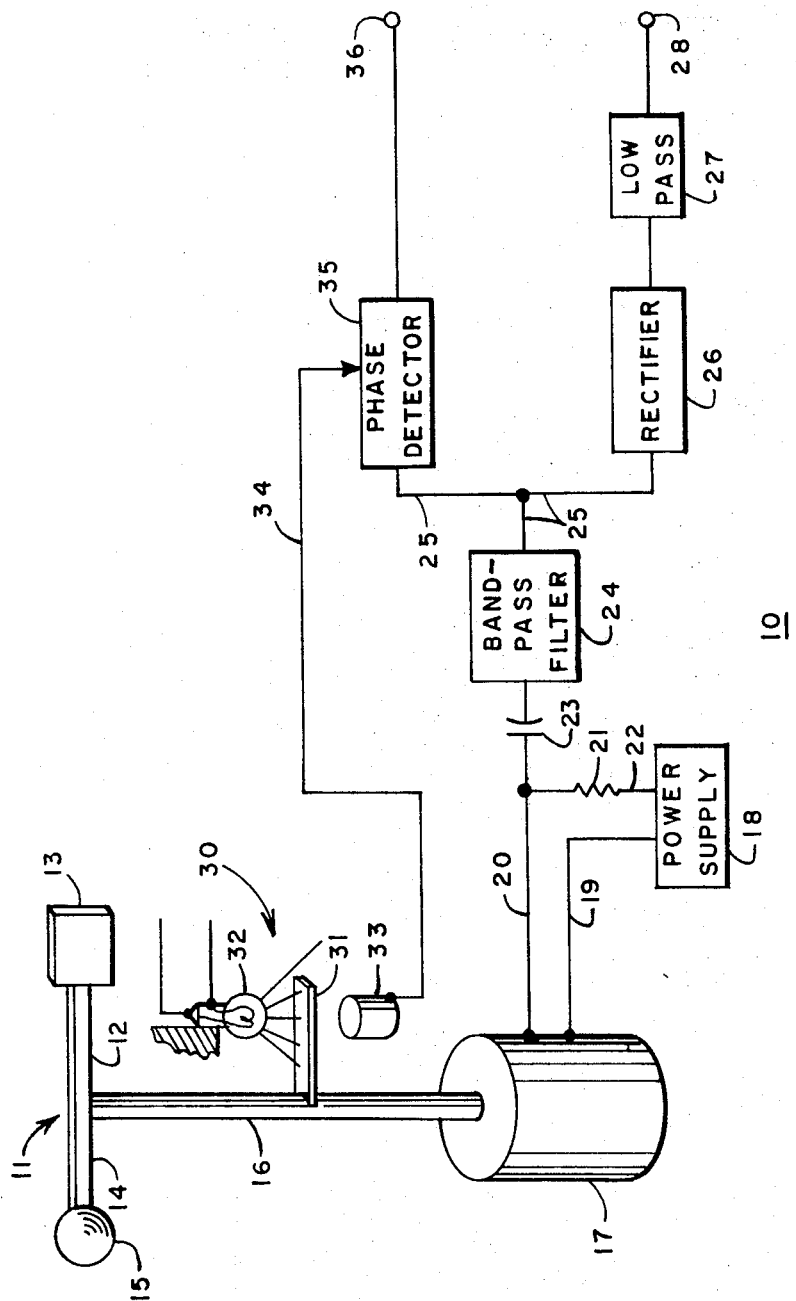
FIG. 1 is a driven rotor anemometer incorporating the present invention.

In FIG. 1, reference numeral 10 generally designates a driven vane anemometer according to the present invention. In anemometer 10, a rotor 11 is provided for rotation in the wind. Rotor 11 comprises an arm 12 to which is attached an aerodynamic drag member, or vane, 13. Also part of rotor 11 is an arm 14 and a counter-balance weight 15. Rotor 11 is attached to a shaft 16. Shaft 16 is attached to the shaft of a DC electric motor 17. In operation, rotor 11 is positioned in the wind, and motor 17 is energized by a suitable DC power supply 18 which supplies current to the motor through the circuit including leads 19 and 20, resistor 21, and lead 22.

It will be appreciated that as rotor 11 rotates, the wind drag that vane 13 experiences varies cyclically throughout the rotation of rotor 11. When vane 13 is moving against the wind, the drag produced is at a maximum, and when vane 13 is rotating with the wind, the drag produced is at a minimum. Accordingly, the torque required by motor 17 to overcome this wind induced drag on the rotor also varies cyclically. According to the present invention, these variations on the torque are measured and used to obtain wind velocity and direction information. The torque produced by motor 17 can be measured by any suitable means, such as strain gauges placed between the motor and a housing to which it is mounted, or by a circuit that measures the current used by the motor. For convenience, the latter method is used in the embodiment shown in FIG. 1.

For simplicity, motor 17 may be a constant speed motor. However, it should be understood that it is not necessary to the invention's operation that the motor be constant speed, since the direction reference means (explained in a subsequent paragraph) rotates with the rotor. It is only necessary that the motor have a reasonably linear torque-current relationship so that reasonably accurate results may be obtained.

In FIG. 1, the current required by motor 17 comprises a DC component with a cyclically varying AC component superimposed thereupon. The purpose of resistor 21 is to develop a small voltage proportional to the current for sensing purposes. The AC component only of this voltage passes through capacitor 23 to a bandpass filter 24, which filters out any high frequency noise which may be present, and produces at its output at lead 25, an AC signal which is proportional to the variations in torque produced by motor 17 to overcome the variations in wind induced drag in rotor 11 throughout its rotational cycle.

The AC signal thus produced at the output of amplifier 24 is referred to as the torque signal, and contains information both as to the magnitude and the direction of the wind. To obtain wind magnitude information, the torque signal is passed through a rectifier 26 and a low pass filter 27. The effect of these two elements is to provide at output terminal 28 a DC voltage whose magnitude is proportional to wind velocity. If the wind velocity is zero, there will be no variation in the torque required throughout the rotational cycle of rotor 11. Consequently, the torque signal at lead 25 will be zero, and the voltage at terminal 28 will be zero. Conversely, when the wind velocity is great, there will be a large cyclic variation in the drag on rotor 11, and a correspondingly large AC torque signal at lead 25. This in turn will produce a large DC voltage at terminal 28.

In order to obtain wind direction information, reference means 30 is provided. In the embodiment shown in FIG. 1, reference means 30 comprises an index key 31, a light source 32, and a photoelectric cell 33. As shaft 16 rotates, index key 31 which is attached thereto periodically blocks the light falling on photocell 33, thus producing a pulse on lead 34. It will be appreciated that in other embodiments, a mechanical switch or a magnetic pickoff may be employed instead of the photocell shown in FIG. 1 for the purpose of generating a reference pulse with each rotation of shaft 16. The reference pulse thus generated is applied to phase detector 35, which also receives the torque signal from lead 25. Phase detector 35 produces an output voltage proportional to the phase difference between the reference pulse and the torque signal. For example, if the wind is from a direction so that the maximum of the torque signal occurs when index key 31 is blocking the light to photocell 33, the maximum of the torque signal and the reference pulse occur simultaneously, and the output of phase detector 35 will be zero. If the wind is from such a direction that the maximum of the torque signal occurs 90° after the reference pulse, the output of phase detector 35 will produce a voltage indicative of the angle by which the maximum lags the reference pulse. In this manner, an output signal at output terminal 36 appears which is indicative of the wind direction with reference to the position of photocell 33. If the direction of photocell 33 with respect to the shaft is known, the wind direction can be determined. Voltage meters, suitably calibrated, can be connected to outputs 28 and 36 to obtain the wind velocity and directions respectively.

Figure 2:
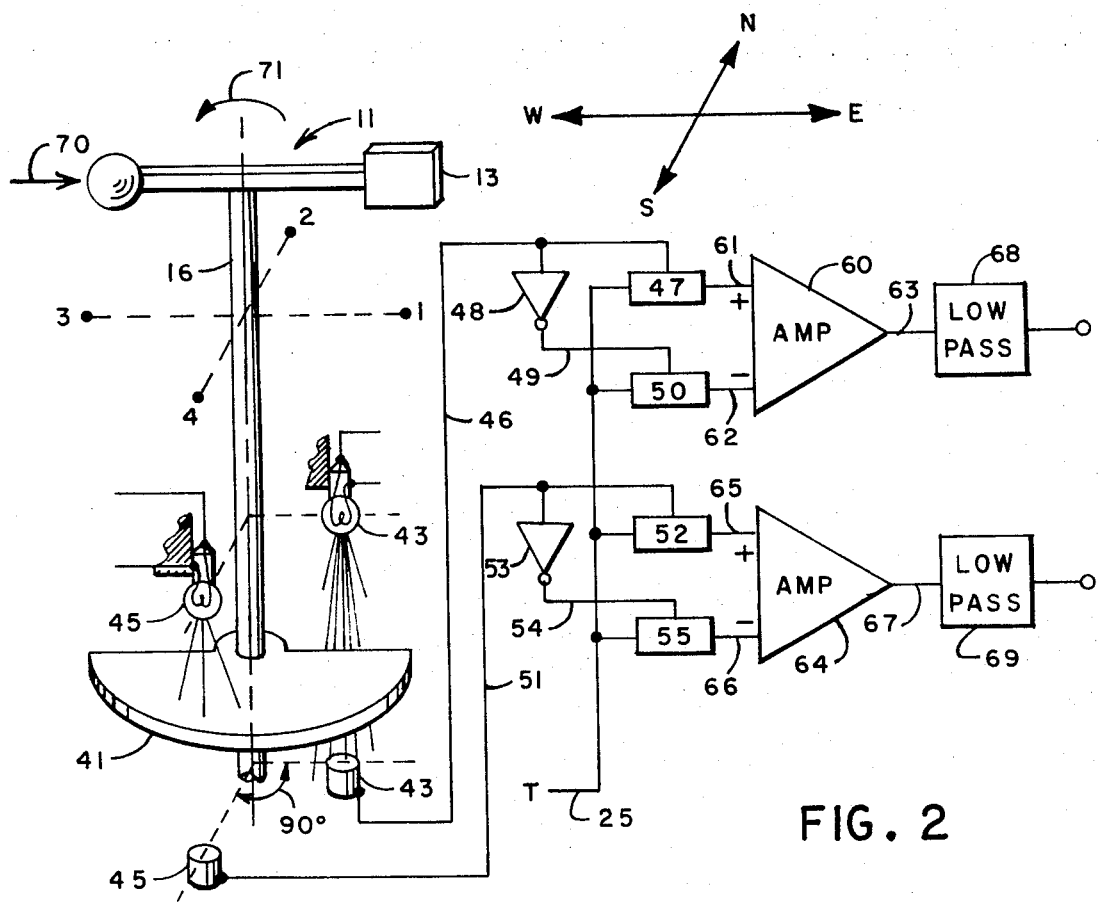
FIG. 2 is a schematic drawing of an anemometer according to the present invention utilizing another embodiment of detection means.

In FIG. 2, there is shown another embodiment of detection means for use with a driven vane anemometer according to the present invention. In FIG. 2 shaft 16 rotates rotor 11. Shaft 16 is rotated by constant speed motor 17 as in FIG. 1. Likewise, a torque signal is generated by circuitry identical to that shown in FIG. 1. This torque signal which appears at lead 25 of FIG. 1 is applied to lead 25 of FIG. 2. Attached to shaft 16 for rotation therewith is a reference means 40, which in this embodiment comprises a half disc 41. A pair of light source-photocell arrangements disposed on either side of disc 41 are provided. Photocells 43 and 45 are disposed 90° apart with reference to shaft 16. As is the case in FIG. 1, suitable mechanical or electromagnetic switching arrangements could be used in place of the photocells.

The reference signal from photocell 43 is applied through lead 46 to a gate circuit 47. This signal is also applied through an inverter 48 and lead 49 to a gate circuit 50. The reference signal from photocell 45 is applied through lead 51 to a gate circuit 52, and through an inverter 53 and lead 54 to a gate circuit 55. The torque signal on lead 25 is applied to each of gate circuits 47, 50, 52 and 55. Gate circuit 47 operates as follows. When a logical "O" signal is applied to gate 47 via lead 46, the gate circuit is OFF and the torque signal applied on lead 25 is prevented from passing to the output of gate circuit 47. Conversely, when a logical "1" signal is applied to gate circuit 47 via lead 46, gate circuit 47 is ON and the torque signal on lead 25 is passed to the output of gate circuit 47. Gate circuits 50, 52, and 55 operate in the same manner.

When photocells 43 and 45 are blocked by disc 41, logical "O" signals are produced on leads 46 and 51. At that time, the action of inverters 48 and 53 produce logical "1" signals on leads 49 and 54. When disc 41 is in such a position that it does not block photocells 43 and 45, logical "1" signals are produced on leads 46 and 51, and logical "O" signals are produced at leads 49 and 54.

The output of gate circuit 47 is connected to input 61 of an operational amplifier 60. Input 61 is the plus, or non-inverting input. The output of gate circuit 50 is connected to input 62 of operational amplifier 60 which is the minus, or inverting input. In similar manner, the outputs of gate circuits 52 and 55 are applied to inputs 65 and 66 of an operational amplifier 64. Output 63 of operational amplifier 60 is connected to a low pass filter 68, and output 67 of operational amplifier 64 is connected to a low pass filter 69.

The circuitry of FIG. 2 is operable to produce at the outputs of low pass filters 68 and 69, voltages indicative of the magnitudes of two mutually orthogonal components of the wind. For example, with proper orientation of photocells 43 and 45, the apparatus of FIG. 2 will measure the easterly and northerly components of the wind. Assuming for purposes of illustration that the wind is from the direction as shown by arrow 70, and that rotor 11 is rotated in the direction indicated by arrow 71, when vane 13 is in position 1 as shown, both photocells 43 and 45 produce logical O's. Likewise, when vane 13 passes through position 2, photocell 45 changes to a "1" and photocell 43 remains at "O." Similarly when vane 13 passes through position 3, photocell 43 changes to a "1", and photocell 45 remains at "1." When vane 13 passes through position 4, photocell 45 changes to a "O" and photocell 43 remains at "1", and when the vane returns to position 1, photocell 43 changes to a "O."

Figure 3:
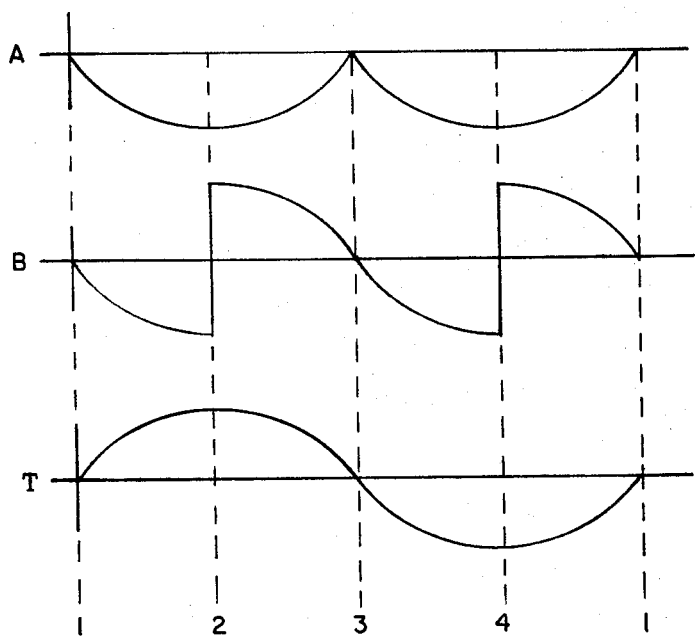
FIG. 3 is a graph showing pertinent wave forms associated with the operation of the embodiment shown in FIG. 2.

In FIG. 3, graph A represents the voltage appearing at output 63 of operational amplifier 60, graph B represents the voltage appearing at output 67 of operational amplifier 64, and graph C represents the torque signal at lead 25. Each graph shows signal variation associated with the four positions of vane 13 indicated in FIG. 2.

Assuming that the direction of the wind is indicated by arrow 70, the torque signal will be at a maximum when vane 13 is in position 2, and at a minimum when vane 13 is at position 4. These variations are shown in graph C of FIG. 3. During the interval of time when vane 13 is moving from position 1 to position 2, logical "O"s appear on both leads 46 and 51. Accordingly, gate circuits 47 and 52 are OFF and gate circuits 50 and 55 are ON. Therefore, during this interval the torque signal from lead 25 is applied to the inverting inputs 62 and 66 of amplifiers 60 and 64, with the result that the inverted torque signal appears at the outputs of both channels, as indicated in graphs A and B. During the interval of time when vane 13 is moving from position 2 to position 3, half disc 41 has moved so that photocell 45 is exposed and photocell 43 remains blocked. Accordingly, a logical "1" appears on lead 51 while a logical "O" remains on lead 46. Accordingly, gate circuits 52 and 50 are ON and gate circuits 47 and 55 are OFF. During this interval the torque signal is applied to the non-inverting input of amplifier 64 and to the inverting input of amplifier 60. The outputs of the two amplifiers during this interval are as follows: the torque signal appears at output 67 and the inverted torque signal appears at output 63. In like manner, the wave forms shown in graphs A and B are produced as the vane rotates through positions 3, 4 and back to 1.

As previously mentioned, the outputs from low pass filters 68 and 69 represent the magnitudes of two orthogonal components of the wind. The low pass filters are used to operate on the signals received from the amplifiers to obtain their average values. In the example discussed above, with the wind from the direction indicated by arrow 70, the average value of the output from amplifier 64 is zero while the output of amplifier 60 has a negative average value, the magnitude of which is proportional to the amplitude of the torque signal, which in turn is indicative of the wind velocity. Specifically, the zero output from low pass filter 69 indicates no northerly component, while the negative voltage output from low pass filter 68 indicates a negative easterly (i.e., a positive westerly) wind component whose magnitude is indicated by the absolute value of the output signal.

The two output signals from low pass filters 68 and 69 may be transmitted by telemetry to a data receiving position, or they may be applied to a suitable readout device which will give wind velocity and direction information directly. For example, the two signals representing the components may be fed into an X–Y plotter or oscilloscope which automatically plots the vector sum of the voltages. The angle of the vector sum with respect to a reference axis will give the true wind direction, and the length of the vector will give wind velocity, when the plotter or oscilloscope is calibrated with the proper scale factor.

The embodiment shown in FIG. 2 may be simplified at the expense of slightly degraded performance by omitting inverters 48 and 53 and gate circuits 50 and 55, and by using amplifiers which have only a non-inverting input. Such a system would give outputs from the amplifiers having half the ripple frequency, and outputs from the low pass filters having only half the voltage that the embodiment of FIG. 2 provides. This simplified embodiment would be analogous to a half wave rectifier circuit, while the embodiment of FIG. 2 is analogous to a full wave rectifier circuit.

Figure 4:
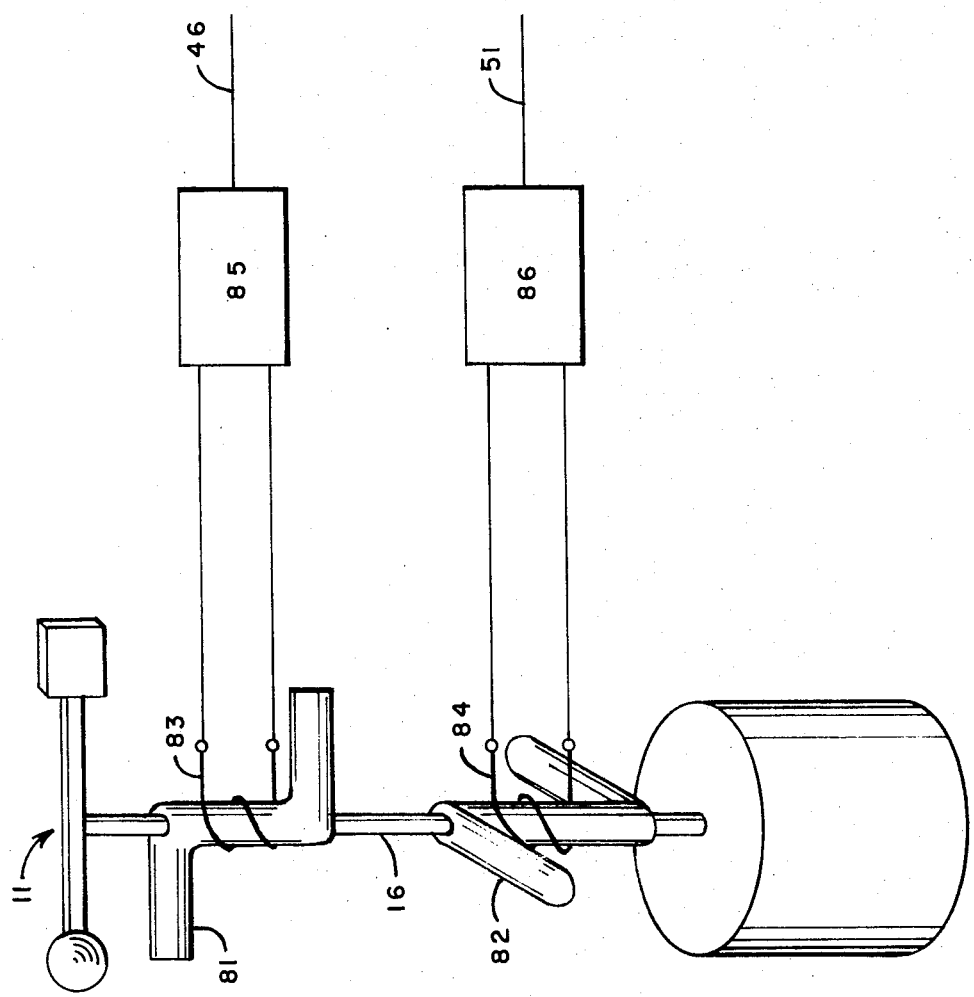
FIG. 4 is a schematic drawing of an alternate reference and pickoff means for use with the present invention.

In FIG. 4 there is shown an automatic reference and pickoff means for use with the detection circuit as shown in FIG. 2. In FIG. 4, a pair of flux concentrators 81 and 82 are attached for rotation with shaft 16. Each flux concentrator is made of a ferromagnetic material, which serves to locally concentrate the earth's magnetic field. A pair of coils 83 and 84 are wound around the central portions of flux concentrators 81 and 82 respectively but do not rotate therewith. Coils 83 and 84 are connected to wave shaping circuits 85 and 86 which in turn are connected to leads 46 and 51, respectively. Leads 46 and 51 connect into interverters 48 and 53 and gate circuits 47 and 52 as shown in FIG. 2.

Flux concentrators 81 and 82 are positioned 90° apart in the same manner as photocells 43 and 45 of FIG. 2, and perform the same function as the photocells, namely, the switching on and off of gate circuits 47, 50, 52, and 55. As shaft 16 rotates, flux concentrator 81 is moved cyclically into and out of alignment with the lines of force of the earth's magnetic field. The cutting through of the lines of force induces a voltage in coil 83, which varies roughly sinusoidally with the rotation of the shaft. Wave shaping circuit 85 amplifies and clips the signals produced by coil 83 to provide a train of pulses on lead 46 which correspond to the position of the shaft. In similar manner, coil 84 and wave shaping circuit 86 produces a train of pulses on lead 51 which lags the pulse train on lead 46 by 90°. These two trains of pulses are used to operate the gate circuits as has already been described with reference to FIG. 2. The advantage of the reference means of FIG. 4 over the photocell arrangement of FIG. 2 is that the flux concentrator automatically establishes a magnetic north reference for the anemometer, whereas the embodiment shown in FIG. 2 requires that the reference direction be carefully adjusted during installation. A driven vane anemometer according to the present invention using the flux conecentrator of FIG. 4 may therefore be mounted on a buoy and will automatically establish a north reference regardless of its orientation when deployed in the water. Furthermore the wind direction information produced by the anemometer will be insensitive to drift of the buoy housing.

I claim as my invention:

1. A driven vane anemometer of the type having a vaned rotor, driving means operatively connected for rotating the vaned rotor, and detection means for indirectly measuring wind velocity by measuring the torque produced by the driving means to overcome the drag torque produced by the wind, wherein the improvement comprises an asymmetrical vaned rotor configured for producing a wind drag torque which varies cyclically with the rotation of the rotor, reference means for producing reference signals indicative of the position of said vaned rotor, and detection means for measuring the cyclic variations in the torque produced by the driving means and for producing signals indicative of wind velocity, said detection means also for comparing the reference signal to the cyclic variations in the torque produced by the driving means and for producing signals indicative of the wind direction relative to the reference means.

2. A driven vane anemometer, comprising:
   a rotatable shaft;
   a vaned rotor connected to said shaft for rotation therewith, said vaned rotor configured for producing a cyclically varying wind drag torque when rotated in the wind;
   driving means operatively connected for rotating said shaft, said driving means operable to apply torque to said shaft to overcome the cyclically varying wind drag torque;
   reference means for producing refreence signals indicative of the position of said vaned rotor; and detection means for measuring cyclic variations in the torque applied to said shaft by said driving means, and for comparing said reference signals to the cyclic variations in applied torque, said detection means operable to produce output signals indicative of wind velocity and wind direction relative to said reference means.

3. Apparatus according to claim 2 wherein said driving means comprises an electric motor, and wherein said detection means includes a circuit for indirectly measuring cyclic variations in the torque produced by the motor by measuring the cyclic variations in the current supplied to the motor.

4. Apparatus according to claim 2 wherein said detection means comprises a phase detector circuit for comparing the phase of said reference signals and the cyclic variations in the torque applied to said shaft for said driving means.

5. Apparatus according to claim 2 wherein said reference means comprises a flux concentrator attached to said shaft for rotation therewith, a coil positioned around said flux concentrator, and a wave shaping circuit connected to said coil for producing reference signals indicative of the position of the shaft with respect to the earth's magnetic field.

6. Apparatus for measuring the velocity and direction of the wind comprising:
   a rotatable shaft;
   drive means connected to said shaft to cause rotation thereof;
   asymmetrical drag means driven by said shaft for rotation in the wind, the force exerted by the wind on said asymmetrical drag means tending to alternately oppose and aid such rotation thereby causing the torque that is required from said drive means to rotate said shaft to cyclically vary with an amplitude determined by the wind velocity;
   detecting means for producing a first output which is indicative of the cyclically varying torque required from said drive means to rotate said shaft and is thus indicative of the wind velocity;
   reference means for producing a second output which is indicative of a predetermined position of said shaft in its rotation, the time relationship of the first output with respect to the second output being indicative of wind direction; and
   comparing means connected to said detecting means and to said reference means to compare the first output with the second output to determine the time relationship therebetween and produce in accordance therewith a resultant output indicative of the wind direction.

7. Apparatus according to claim 6 wherein the second output produced by said reference means has a first component which is present whenever said shaft is in the first and second quadrants of its rotation and a second component whenever said shaft is in the second and third quadrants of its rotation; and wherein said comparing means includes first and second gates, each connected to receive the first output from said detecting means, the first gate being connected to said reference means and operable to produce a first further output which varies with the first output only when the first component is present in the second output, the second gate being connected to said reference means and operable to produce a second further output which varies with the first output only when the second componet is present in the second output, the first and second further outputs being thus indicative of the magnitude of two mutually orthoganal components of the wind velocity and hence comprising the resultant output indicative of the wind direction.

* * * * *